United States Patent [19]

Yamaguchi et al.

[11] 3,988,623
[45] Oct. 26, 1976

[54] CASE FOR A SMALL-SIZED ELECTRIC MOTOR

[75] Inventors: Terumoto Yamaguchi; Yoshinao Amano, both of Anjo, Japan

[73] Assignee: Nippondenso Co., Ltd., Kariya, Japan

[22] Filed: Mar. 20, 1973

[21] Appl. No.: 342,984

[30] Foreign Application Priority Data
Mar. 30, 1972 Japan.............................. 47-37761

[52] U.S. Cl.......................... 310/154; 310/40 MM; 310/254
[51] Int. Cl.² ......................................... H02K 1/18
[58] Field of Search ............... 310/154, 254, 42, 89, 310/40 R, 40 MM

[56] References Cited
UNITED STATES PATENTS

| 3,165,654 | 1/1965 | Mabuchi........................ 310/40 MM |
| 3,510,707 | 5/1970 | Stone et al....................... 310/154 X |
| 3,631,277 | 12/1971 | Ferdig et al........................ 310/154 |

*Primary Examiner*—Mark O. Budd

[57] ABSTRACT

In a case for a small-sized motor, there are provided projections and convex portions in the cylindrical portion of the case for holding permanent magnets in the case without using any binding agent, springs or screws.

2 Claims, 6 Drawing Figures

CASE FOR A SMALL-SIZED ELECTRIC MOTOR

BACKGROUND OF THE INVENTION

This invention relates to construction of a case for a small-sized electric motor.

In a conventional case for a small-sized electric motor arched magnets are fixed to the case for a small-sized electric motor either by means of binding agent, springs or screws. However, fixing by the binding agent causes a problem in that the arched magnets are not fixed stably enough to withstand vibration. And fixing by the springs or the screws required more elements and assembling steps.

SUMMARY OF THE INVENTION

It is an object of the present invention to provide an useful and economical case for a small-sized electric motor, in which said case is provided with projections and convex portions for readily holding permanent magnets.

DESCRIPTION OF THE PREFERRED EMBODIMENT

Figure 1:
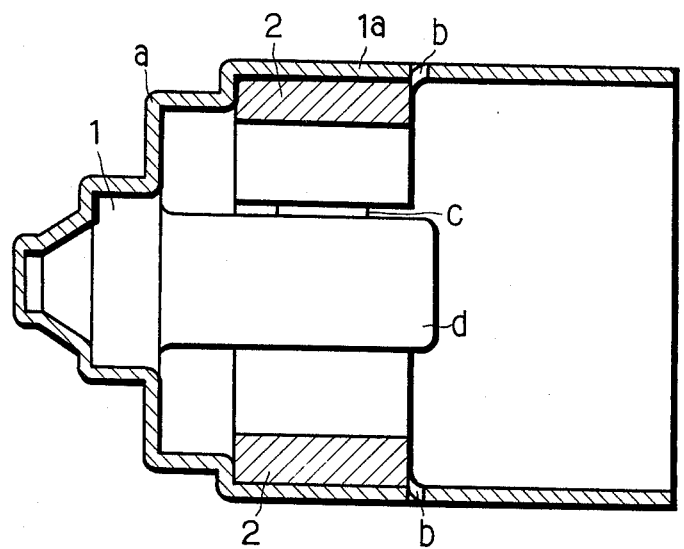
FIG. 1 shows a partial cross section of the motor case of the present invention.
Figure 2:
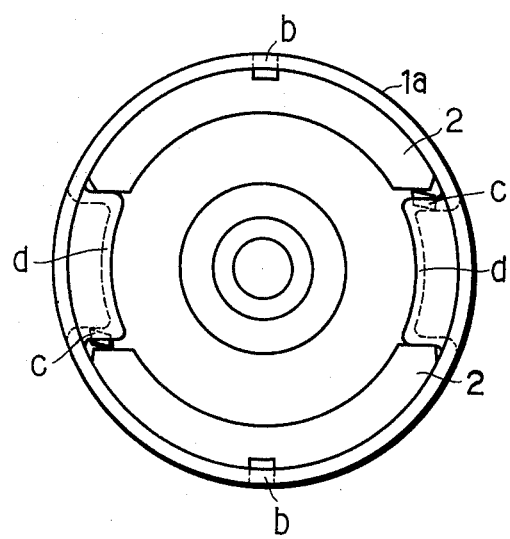
FIG. 2 shows a front view of the case illustrated in FIG. 1.
Figure 3:
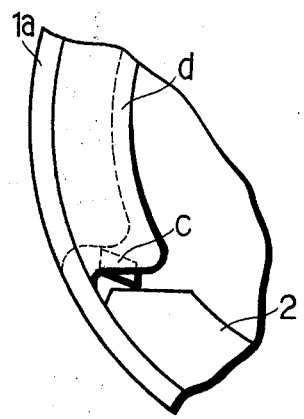
FIG. 3 shows an enlarged partial view of the motor case illustrated in FIG. 2.

Now referring to FIG. 1, FIG. 2 and FIG. 3, showing the first embodiment of the invention, a numeral number 1 designates a case for a small-sized electric motor. Two arched permanent magnets 2 are disposed on an inner periphery of a cylindrical portion 1a of the case 1. A symbol a designates a shoulder portion provided at the end of the inner periphery of the cylindrical portion 1a. The shoulder a abuts the magnets at one of their axial ends. A symbol d designates a convex portion which is protruded between the two magnets 2 from the cylindrical portion 1a in the radial direction. A symbol c designates a projection which is provided on the convex portion d by cutting and pressing in a circular direction of the cylindrical portion 1a. The projection c urges the ends of magnets in the circular direction. Another projection b is provided on the cylindrical portion 1a by cutting and pressing, and this projection b urges the magnet 2 to the shoulder a. In a construction as aforementioned, the shoulder a, the first projection c, the second projection b and the convex portion d are easily formed unitary with the cylindrical portion by a pressing process. The magnet 2 is disposed on the inner periphery of the cylindrical portion 1a of the case 1 and between the shoulder a and the second projection b.

The magnet 2 is put into the case 1 until it abuts the shoulder a provided in the cylindrical portion 1a. The spring action of the projection b urges the magnet 2 to the shoulder a, whereby the magnet 2 is secured in its correct axial position. At the same time the magnet 2 is held between the first projection c and the side of another convex portion d, whereby the magnet 2 is secured stably in the inner periphery of the cylindrical portion 1a by the spring action of the first projection c.

Figure 4:
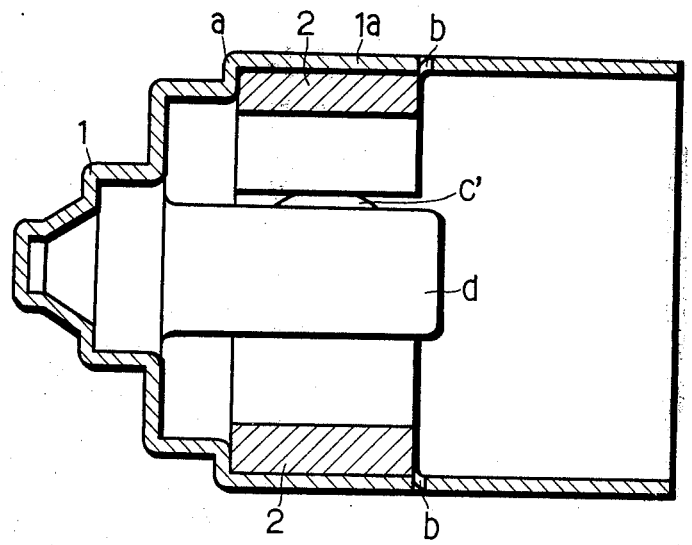
FIG. 4 shows a partial cross section of another motor case of the present invention.
Figure 5:
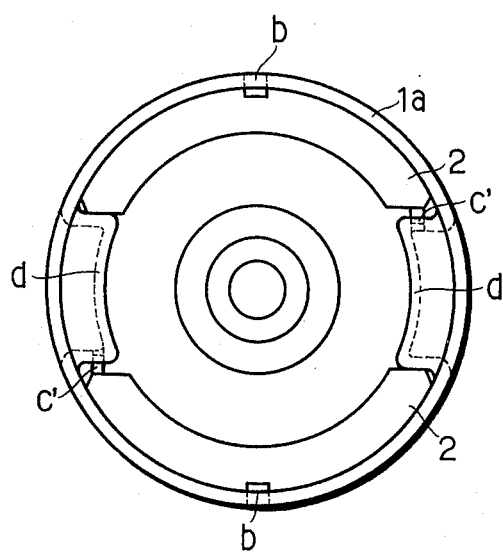
FIG. 5 shows a front view of the case illustrated in FIG. 4.
Figure 6:
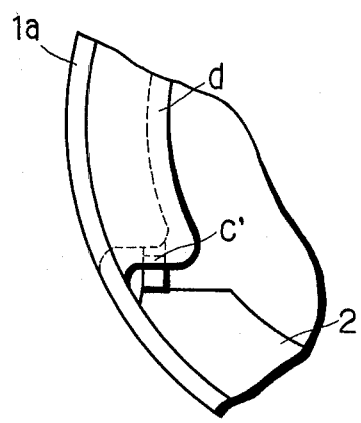
FIG. 6 shows an enlarged partial view of the motor case illustrated in FIG. 5.

The first projection c may be substituted for a projection c' shown in FIGS. 4, 5 and 6. As shown in these figures, the projection c' is formed by cutting both sides of the projection c', while the projection c is formed by cutting three sides thereof. The projection c' and the convex portion d hold the magnet 2 stably therebetween and against the inner periphery of the cylindrical portion 1a in the same manner as described in FIGS. 1, 2, and 3. Though the second projection b serves to restrict movement of the magnet 2 in the axial direction, the magnet 2 can be restricted in the axial direction by the first projection c or c' and the convex portion d alone without using the second projection b. Therefore, in this case the second projection b can be eliminated.

What is claimed is:

1. A metallic case for a small-sized electric motor in which arched magnets are disposed on an inner periphery of a cylindrical portion of the case comprising, a shoulder extending inwardly from said inner periphery in a radial direction for abutting an end face of said magnet in the axial direction thereof, a convex portion protruding inwardly from said cylindrical portion in the radial direction, and a first projection having a spring action integrally provided on one side of said convex portion for urging said magnet in a circular direction, whereby said magnet is secured to the inner periphery of said cylindrical portion.

2. A metallic case for a small-sized electric motor as in claim 1 further comprising a second projection having a spring action projecting from said cylindrical portion for restricting the movement of said magnet in an axial direction.

* * * * *